US012407127B2

(12) United States Patent
Echizenya et al.

(10) Patent No.: US 12,407,127 B2
(45) Date of Patent: Sep. 2, 2025

(54) SEAL MEMBER FOR MOUNTING WITHIN A WATERPROOF CONNECTOR

(71) Applicant: Japan Aviation Electronics Industry, Limited, Tokyo (JP)

(72) Inventors: Toshihito Echizenya, Tokyo (JP); Yukuya Morishita, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 393 days.

(21) Appl. No.: 17/943,375

(22) Filed: Sep. 13, 2022

(65) Prior Publication Data

US 2023/0127092 A1 Apr. 27, 2023

(30) Foreign Application Priority Data

Oct. 25, 2021 (JP) ................................. 2021-173715

(51) Int. Cl.
*H01R 13/52* (2006.01)
*H01R 13/516* (2006.01)

(52) U.S. Cl.
CPC ....... *H01R 13/5202* (2013.01); *H01R 13/516* (2013.01); *H01R 13/5219* (2013.01)

(58) Field of Classification Search
CPC .............. H01R 13/5202; H01R 13/516; H01R 13/5219
See application file for complete search history.

(56) References Cited

U.S. PATENT DOCUMENTS 5,158,391 A * 10/1992 Fujitani .............. H01R 13/5202 439/271
8,491,323 B2 7/2013 Ishibashi
(Continued)

FOREIGN PATENT DOCUMENTS

DE 10 2014 110 466 A1 1/2016
EP 3 282 522 A1 2/2018
(Continued)

OTHER PUBLICATIONS

Korean Office Action issued for Korean Application No. 10-2022-0120524, Dated Jun. 24, 2024 (with English translation).
(Continued)

*Primary Examiner* — Vanessa Girardi
(74) *Attorney, Agent, or Firm* — Collard & Roe, P.C.

(57) ABSTRACT

A waterproof connector comprises a terminal, a housing and a seal member. The housing is provided with an attachment portion. When the attachment portion is viewed along a front-rear direction, the attachment portion has an outer circumferential shape including first sides and first coupling portions. The seal member is formed of elastic material and is attached to the attachment portion. When the seal member is viewed along the front-rear direction, the seal member has a closed-ring shape including second sides and second coupling portions. The second sides correspond to the first sides, respectively. The second sides include at least one specific second side. $L_1>L_2$, where $L_2$ is a length of each of the second sides in a state before the seal member is attached to the attachment portion, and $L_1$ is a length of the corresponding first side.

6 Claims, 9 Drawing Sheets

(56) References Cited

U.S. PATENT DOCUMENTS

| | | | | |
|---|---|---|---|---|
| 9,293,856 | B2 | 3/2016 | Shigeta et al. | |
| 11,050,185 | B2 * | 6/2021 | Minamino ......... | H01R 13/5219 |

FOREIGN PATENT DOCUMENTS

| | | | |
|---|---|---|---|
| JP | H07-240253 | A | 9/1995 |
| JP | 2012-128966 | A | 7/2012 |
| JP | 2014-099255 | A | 5/2014 |
| JP | 2021-039837 | A | 3/2021 |
| JP | 2021-082499 | A | 5/2021 |
| JP | 2021-101418 | A | 7/2021 |
| JP | 2021-111575 | A | 8/2021 |

OTHER PUBLICATIONS

European Search Report dated Mar. 15, 2023 in European Application No. 22196253.3.

* cited by examiner

SEAL MEMBER FOR MOUNTING WITHIN A WATERPROOF CONNECTOR

CROSS REFERENCE TO RELATED APPLICATIONS

This application is based on and claims priority under 35 U.S.C. § 119 to Japanese Patent Application No. JP2021-173715 filed Oct. 25, 2021, the contents of which are incorporated herein in their entirety by reference.

BACKGROUND OF THE INVENTION

This invention relates to a waterproof connector comprising a seal member.

JPA2014-99255 (Patent Document 1) discloses a waterproof connector 900 of this type. Referring to FIG. 17, the waterproof connector 900 of Patent Document 1 is mateable with a mating connector (not shown) along a mating direction, or along an X-direction. The waterproof connector 900 comprises terminals 910, a housing 920 and a seal member 950. The terminals 910 are held by the housing 920. The housing 920 is provided with an attachment portion 922. The seal member 950 is formed of elastic material and is attached to the attachment portion 922.

The waterproof connector 900 of Patent Document 1 has a drawback that the seal member 950 might be twisted when the waterproof connector 900 is mated with or removed from the mating connector.

SUMMARY OF THE INVENTION

It is an object of the present invention to provide a waterproof connector which can prevent twisting of a seal member when the waterproof connector is mated with or removed from a mating connector.

In an attempt by the inventors of the present application to design a waterproof connector that can prevent twisting of a seal member, the inventors have found that twisting of a seal member can be prevented in a specific case where a shape and/or size of the seal member is smaller than a shape and/or size of an attachment portion of a housing in a plane perpendicular to a mating direction. In addition, the inventors also have found that sealing characteristics between a waterproof connector and a mating connector might be degraded in the specific case.

Then, the inventors further studied a cause of the degradation of the sealing characteristics and have found that the degradation of the sealing characteristics is caused as follows: if amounts of distortions produced in sides of a seal member are different from one another upon attachment of the seal member to an attachment portion, forces applied to a coupling portion coupling two of the sides with each other are unbalanced, and thereby a position of the coupling portion on the attachment portion is deviated from an appropriate position.

Based on the above, the inventors have conceived that a position of a coupling portion of a seal member on an attachment portion is prevented from being deviated from an appropriate position by providing recesses on opposite ends in a mating direction of its specific side, whose amount of distortion is expected to be maximum as compared to any of amounts of distortions of its sides other than the specific side, so that the specific side is easily stretched while forces applied to the coupling portion are well balanced upon attachment of the seal member to the attachment portion. The present invention stems from the conceiving as described above.

One aspect of the present invention provides a waterproof connector mateable with a mating connector along a front-rear direction. The waterproof connector comprises a terminal, a housing and a seal member. The terminal is held by the housing. The housing is provided with an attachment portion. When the attachment portion is viewed along the front-rear direction, the attachment portion has an outer circumferential shape including first sides and first coupling portions. The first coupling portions extend in directions which are different from one another. Each of the first coupling portions couples the first sides, which are adjacent to each other, with each other. The seal member is formed of elastic material and is attached to the attachment portion. When the seal member is viewed along the front-rear direction, the seal member has a closed-ring shape including second sides and second coupling portions. The second sides correspond to the first sides, respectively. The second coupling portions extend in directions which are different from one another. Each of the second coupling portions couples the second sides, which are adjacent to each other, with each other. The second sides include at least one specific second side. The at least one specific second side is provided with a front recess and a rear recess. The front recess is recessed rearward in the front-rear direction. The rear recess is recessed forward in the front-rear direction. $L_1>L_2$, where $L_2$ is a length of each of the second sides in a state before the seal member is attached to the attachment portion, and $L_1$ is a length of the corresponding first side. An expected amount G of distortion of each of the second sides upon attachment of the seal member to the attachment portion is defined by an equation of $G=(L_1-L_2)/L_2$. The expected amount G of the distortion of the at least one specific second side is maximum among the expected amounts G of the distortions of the second sides.

The waterproof connector of the present invention is configured as follows: when the attachment portion is viewed along the front-rear direction, the attachment portion has the outer circumferential shape including the first sides and the first coupling portions; when the seal member is viewed along the front-rear direction, the seal member has the closed-ring shape including the second sides and the second coupling portions; and $L_1>L_2$, where $L_2$ is the length of each of the second sides in the state before the seal member is attached to the attachment portion, and $L_1$ is the length of the corresponding first side. Thus, the waterproof connector of the present invention can prevent twisting of the seal member when the waterproof connector is mated with or removed from the mating connector.

Furthermore, the waterproof connector of the present invention is configured as follows: the second sides include the at least one specific second side; the expected amount G of the distortion of each of the second sides upon attachment of the seal member to the attachment portion is defined by the equation of $G=(L_1-L_2)/L_2$, and the expected amount G of the distortion of the at least one specific second side is maximum among the expected amounts G of the distortions of the second sides; and the at least one specific second side is provided with the front recess and the rear recess. Thus, the at least one specific second side is easily stretched as compared to any of the second sides other than the specific second side, and thereby a position of the second coupling portion on the attachment portion is prevented from being deviated from an appropriate position. That is, the waterproof connector of the present invention prevents degradation of sealing characteristics.

An appreciation of the objectives of the present invention and a more complete understanding of its structure may be had by studying the following description of the preferred embodiment and by referring to the accompanying drawings.

Figure 1:
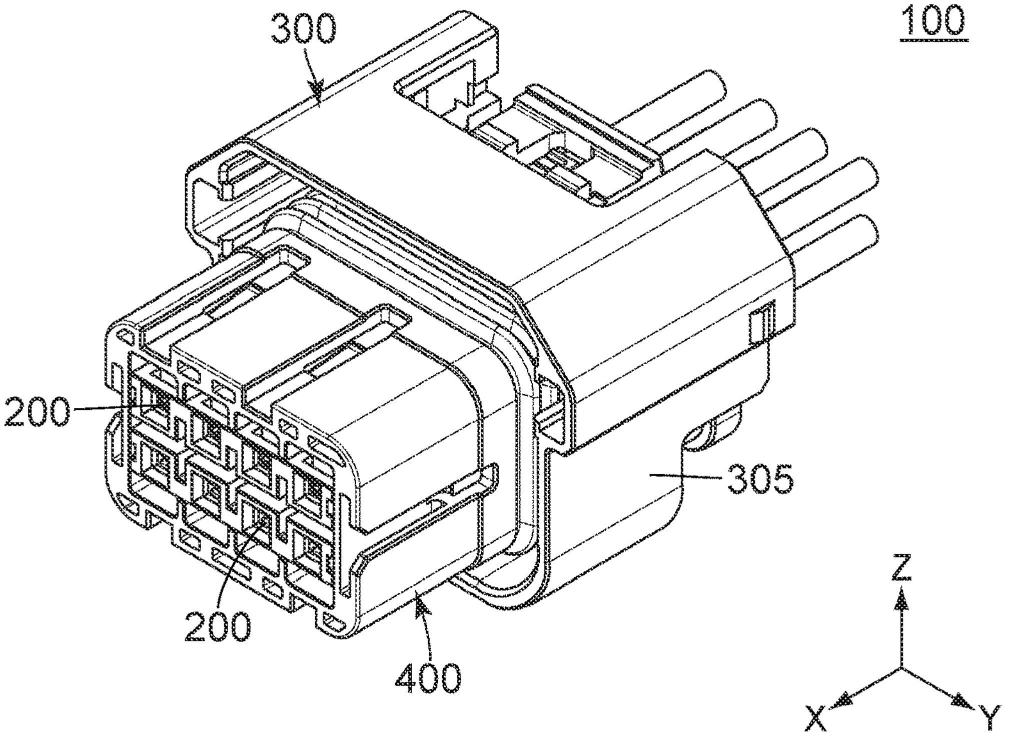
FIG. 1 is a perspective view showing a waterproof connector according to an embodiment of the present invention.
Figure 2:
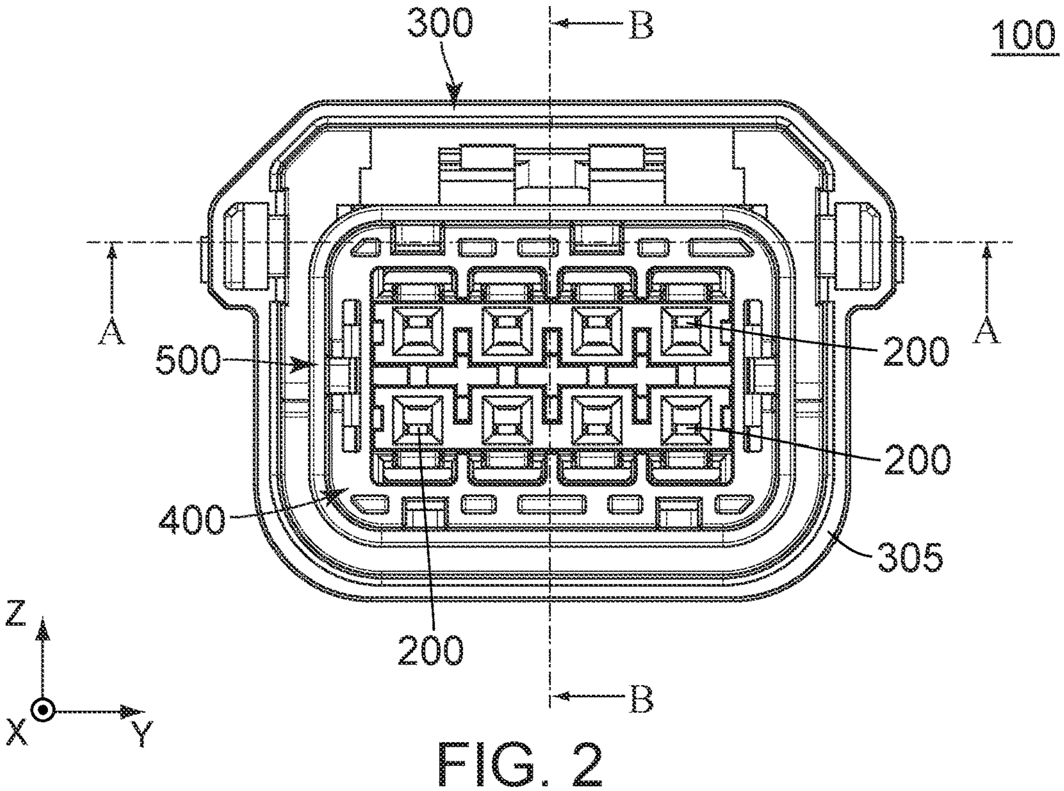
FIG. 2 is a front view showing the waterproof connector of FIG. 1.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Referring to FIG. 1, a waterproof connector 100 according to an embodiment of the present invention is mateable with a mating connector along a front-rear direction. More specifically, the waterproof connector 100 of the present embodiment is mateable from its rear along the front-rear direction with the mating connector which is positioned forward of the waterproof connector 100. In the present embodiment, the front-rear direction is an X-direction. Specifically, forward is a positive X-direction while rearward is a negative X-direction.

Figure 7:
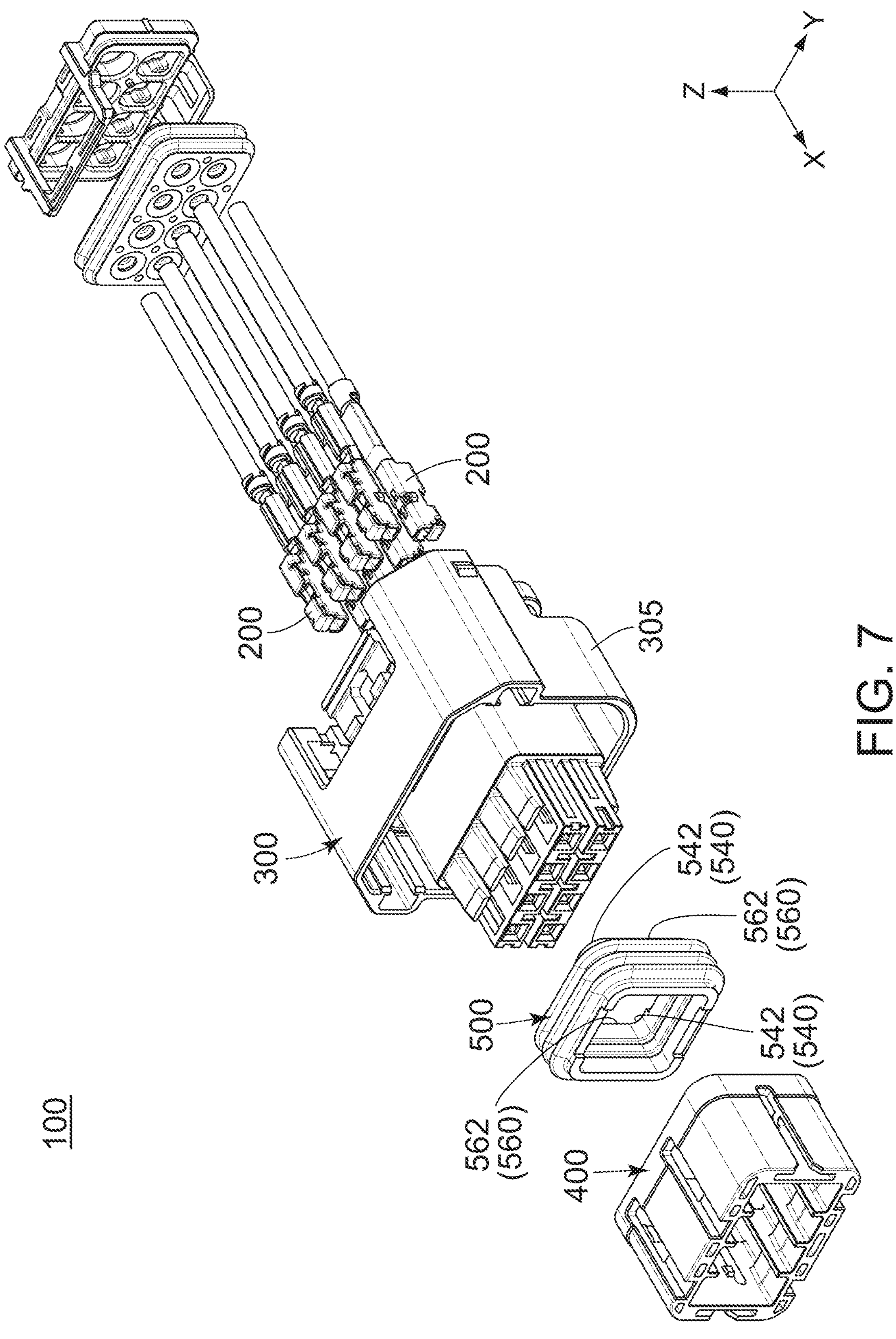
FIG. 7 is an exploded, perspective view showing the waterproof connector of FIG. 1.

As shown in FIG. 7, the waterproof connector 100 of the present embodiment comprises a housing 300, a seal member 500 and a plurality of terminals 200. However, the present invention is not limited thereto, but the number of the terminal 200 may be one. In other words, the waterproof connector 100 should comprise the housing 300, the seal member 500 and the terminal 200.

Referring to FIG. 7, the housing 300 of the present embodiment is made of insulator. The housing 300 has a surrounding portion 305.

Figure 9:
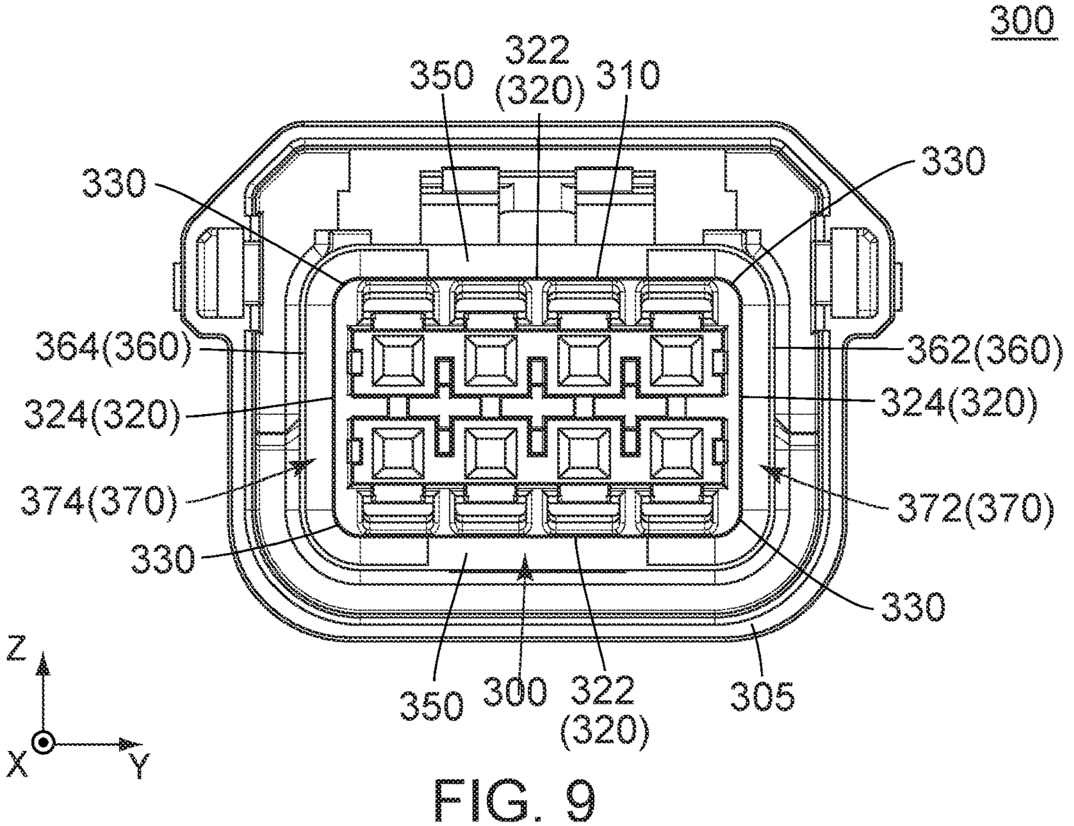
FIG. 9 is a front view showing the housing of FIG. 8.
Figure 10:
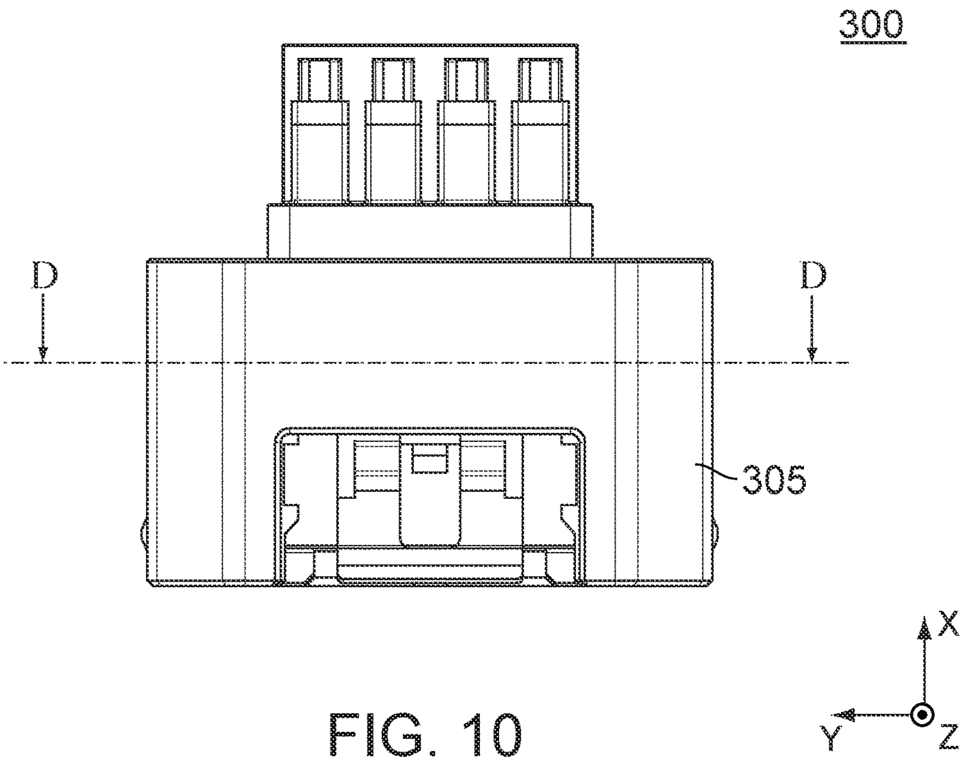
FIG. 10 is a top view showing the housing of FIG. 8.

Referring to FIG. 9, the surrounding portion 305 of the present embodiment defines an outer end of the housing 300 in a direction perpendicular to the front-rear direction.

Figure 11:
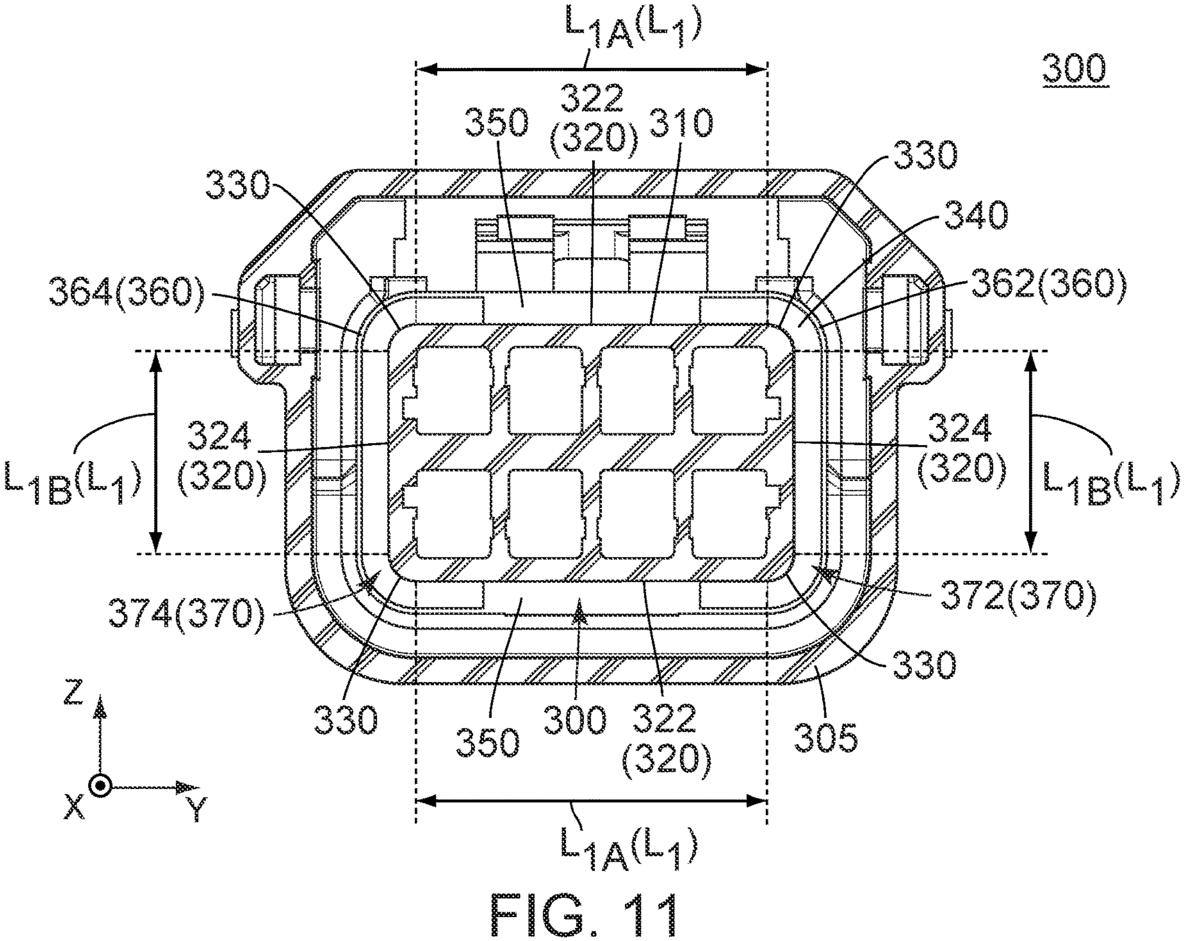
FIG. 11 is a cross-sectional view showing the housing of FIG. 10, taken along line D-D.
Figure 12:
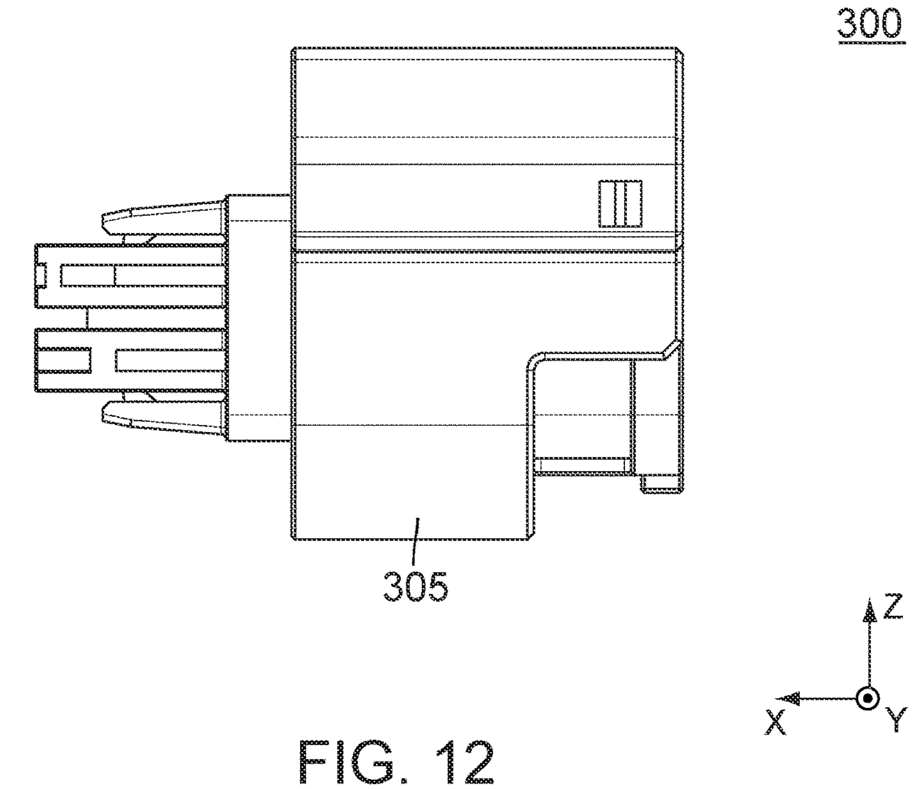
FIG. 12 is a side view showing the housing of FIG. 8.

As shown in FIG. 11, the housing 300 is provided with an attachment portion 310.

Referring to FIG. 11, a part of the attachment portion 310 of the present embodiment is surrounded by the surrounding portion 305 in a plane perpendicular to the front-rear direction. The attachment portion 310 has an outer circumference having a rectangular shape with rounded corners in the plane perpendicular to the front-rear direction. Specifically, when the attachment portion 310 is viewed along the front-rear direction, the attachment portion 310 has an outer circumferential shape including first sides 320 and first coupling portions 330.

As shown in FIG. 11, the first sides 320 of the present embodiment include two long sides 322 and two short sides 324. Specifically, the first sides 320 are composed of the two long sides 322 and the two short sides 324.

As shown in FIG. 11, each of the long sides 322 of the present embodiment extends in a horizontal direction perpendicular to the front-rear direction. In the present embodiment, the horizontal direction is a Y-direction. In addition, the horizontal direction is also referred to as a right-left direction. Specifically, it is assumed that rightward is a positive Y-direction while leftward is a negative Y-direction. The two long sides 322 are positioned away from each other in an up-down direction perpendicular to both the front-rear direction and the horizontal direction. The long side 322, which is positioned at an upper side of the attachment portion 310, of the two long sides 322 defines an upper end of the attachment portion 310 in the up-down direction. The long side 322, which is positioned at a lower side of the attachment portion 310, of the two long sides 322 defines a lower end of the attachment portion 310 in the up-down direction. In the present embodiment, the up-down direction is a Z-direction. Specifically, upward is a positive Z-direction while downward is a negative Z-direction.

As shown in FIG. 11, each of the short sides 324 of the present embodiment extends in the up-down direction perpendicular to both the front-rear direction and the horizontal direction. The two short sides 324 are positioned away from each other in the horizontal direction. The short side 324, which is positioned at a right side of the attachment portion 310, of the two short sides 324 defines a right end of the attachment portion 310 in the right-left direction. The short side 324, which is positioned at a left side of the attachment portion 310, of the two short sides 324 defines a left end of the attachment portion 310 in the right-left direction.

As shown in FIG. 11, a length $L_{1A}$ of the long side 322 in the horizontal direction is greater than a length $L_{1B}$ of the short side 324 in the up-down direction.

As shown in FIG. 11, the first coupling portions 330 of the present embodiment extend in directions which are different from one another. Each of the first coupling portions 330 couples the first sides 320, which are adjacent to each other, with each other. More specifically, each of the first coupling portions 330 couples the long side 322 and the short side 324, which are adjacent to each other, with each other.

As shown in FIG. 11, the housing 300 has a rear end portion 340.

Figure 3:
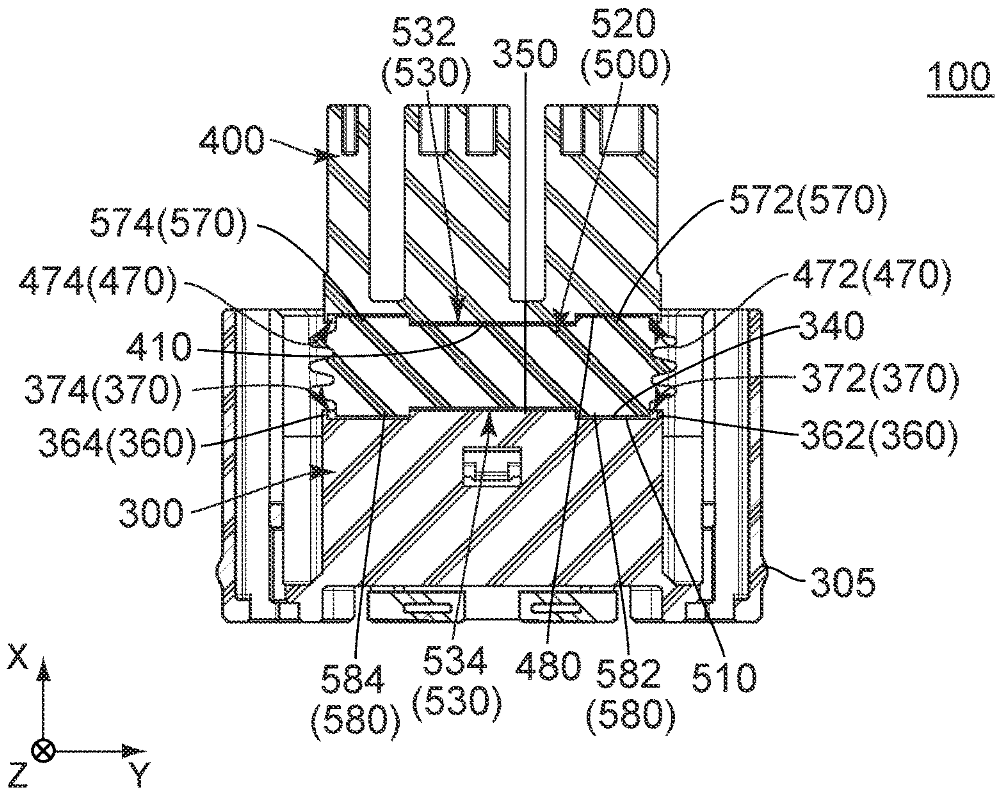
FIG. 3 is a cross-sectional view showing the waterproof connector of FIG. 2, taken along line A-A.

As shown in FIG. 11, the rear end portion 340 of the present embodiment faces forward in the front-rear direction. The rear end portion 340 is positioned outside the attachment portion 310 in the plane perpendicular to the front-rear direction. As understood from FIGS. 3 and 4, the attachment portion 310 extends forward in the front-rear direction from the rear end portion 340. As shown in FIG. 3, a rear end 510 of the seal member 500 in the front-rear direction is pressed against the rear end portion 340.

As shown in FIG. 11, the housing 300 further has a wall portion 360 and a first accommodating portion 370.

Figure 8:
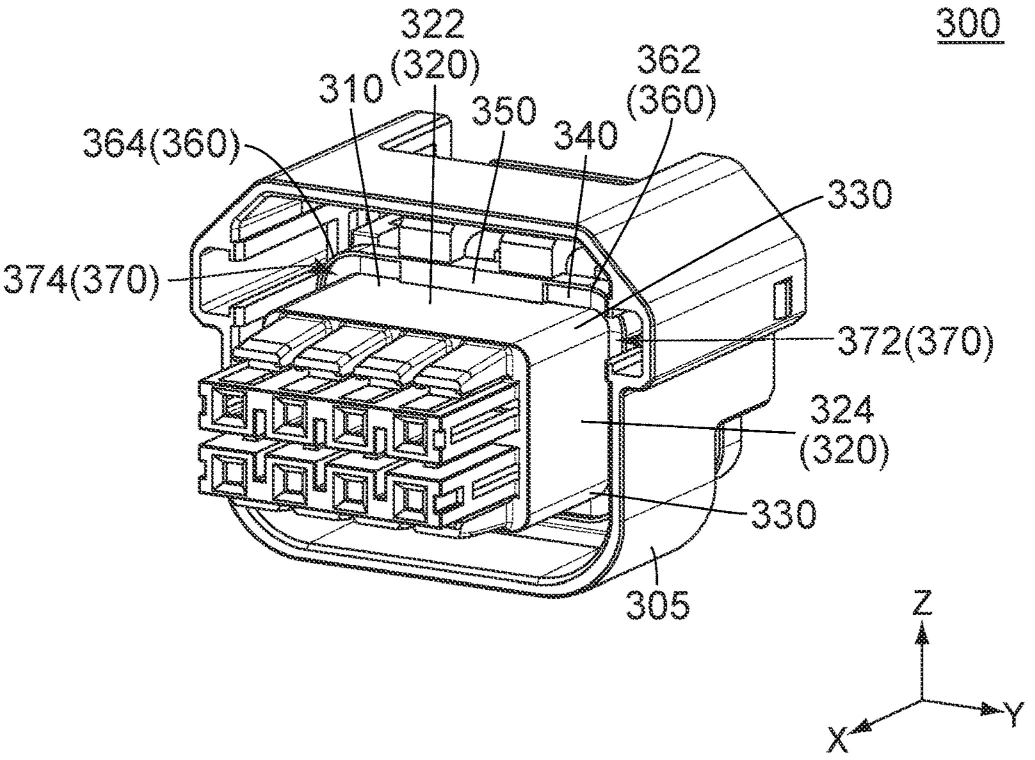
FIG. 8 is a perspective view showing a housing which is included in the waterproof connector of FIG. 7.

As shown in FIG. 11, the wall portion 360 of the present embodiment is positioned inside the surrounding portion 305 in the direction perpendicular to the front-rear direction. The attachment portion 310 is positioned inside the wall portion 360 in the direction perpendicular to the front-rear direction. As shown in FIG. 8, the wall portion 360 extends forward in the front-rear direction from the rear end portion 340. In the front-rear direction, a front end of the wall portion 360 is positioned rearward beyond a front end of the surrounding portion 305. In the front-rear direction, the front end of the wall portion 360 is positioned rearward beyond a front end of the attachment portion 310.

As shown in FIG. 11, the wall portion 360 includes a right wall portion 362 and a left wall portion 364.

As shown in FIG. 11, the right wall portion 362 of the present embodiment is positioned rightward of the left wall portion 364 in the right-left direction. The right wall portion 362 and the left wall portion 364 are arranged in the right-left direction. The right wall portion 362 and the left wall portion 364 are positioned at positions same as each other in the front-rear direction.

As shown in FIG. 11, the left wall portion 364 of the present embodiment is positioned leftward of the right wall portion 362 in the right-left direction.

Referring to FIG. 11, the first accommodating portion 370 of the present embodiment is a recess which is recessed rearward in the front-rear direction. The first accommodating portion 370 is positioned between the wall portion 360 and the attachment portion 310. The first accommodating portion 370 is positioned inside the wall portion 360 in the direction perpendicular to the front-rear direction. The first accommodating portion 370 is positioned outside the attachment portion 310 in the direction perpendicular to the front-rear direction. The rear end portion 340 defines a rear end of the first accommodating portion 370 in the front-rear direction. The first accommodating portion 370 includes a first right accommodating portion 372 and a first left accommodating portion 374.

As shown in FIG. 11, the first right accommodating portion 372 of the present embodiment is positioned rightward of the first left accommodating portion 374 in the right-left direction. The first right accommodating portion 372 is positioned leftward of the right wall portion 362 in the right-left direction. The first right accommodating portion 372 and the first left accommodating portion 374 are arranged in the right-left direction.

As shown in FIG. 11, the first left accommodating portion 374 of the present embodiment is positioned leftward of the first right accommodating portion 372 in the right-left direction. The first left accommodating portion 374 is positioned rightward of the left wall portion 364 in the right-left direction.

As shown in FIG. 11, the housing 300 is provided with two rear rotation prevention portions 350. However, the present invention is not limited thereto, but the number of the rear rotation prevention portion 350 may be one.

As shown in FIG. 3, each of the rear rotation prevention portions 350 protrudes forward in the front-rear direction from the rear end portion 340. As shown in FIG. 11, each of the rear rotation prevention portions 350 is positioned at a middle of the housing 300 in the horizontal direction. The two rear rotation prevention portions 350 are arranged in the up-down direction. In the front-rear direction, a front end of each of the rear rotation prevention portions 350 is positioned at a position same as a position of the front end of the wall portion 360. The two rear rotation prevention portions 350 are positioned at positions same as each other in the right-left direction. The right wall portion 362 is positioned rightward of any of the rear rotation prevention portions 350 in the right-left direction. The right wall portion 362 is coupled with any of the rear rotation prevention portions 350. The right wall portion 362 couples the two rear rotation prevention portions 350 with each other. The left wall portion 364 is positioned leftward of any of the rear rotation prevention portions 350 in the right-left direction.

The left wall portion 364 is coupled with any of the rear rotation prevention portions 350. The left wall portion 364 couples the two rear rotation prevention portions 350 with each other. Each of the rear rotation prevention portions 350 is positioned between the first right accommodating portion 372 and the first left accommodating portion 374 in the right-left direction. The first right accommodating portion 372 is positioned rightward of any of the rear rotation prevention portions 350 in the right-left direction. The first left accommodating portion 374 is positioned leftward of any of the rear rotation prevention portions 350 in the right-left direction.

Figure 13:
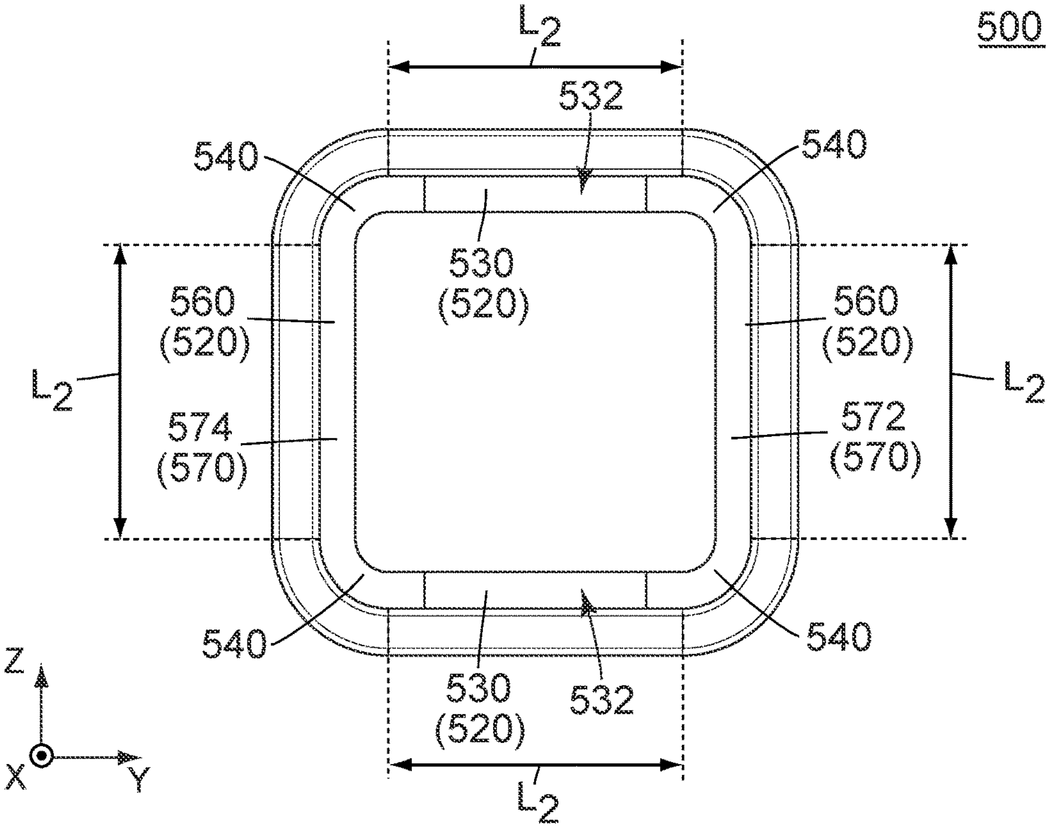
FIG. 13 is a front view showing a seal member which is included in the waterproof connector of FIG. 7.
Figure 14:
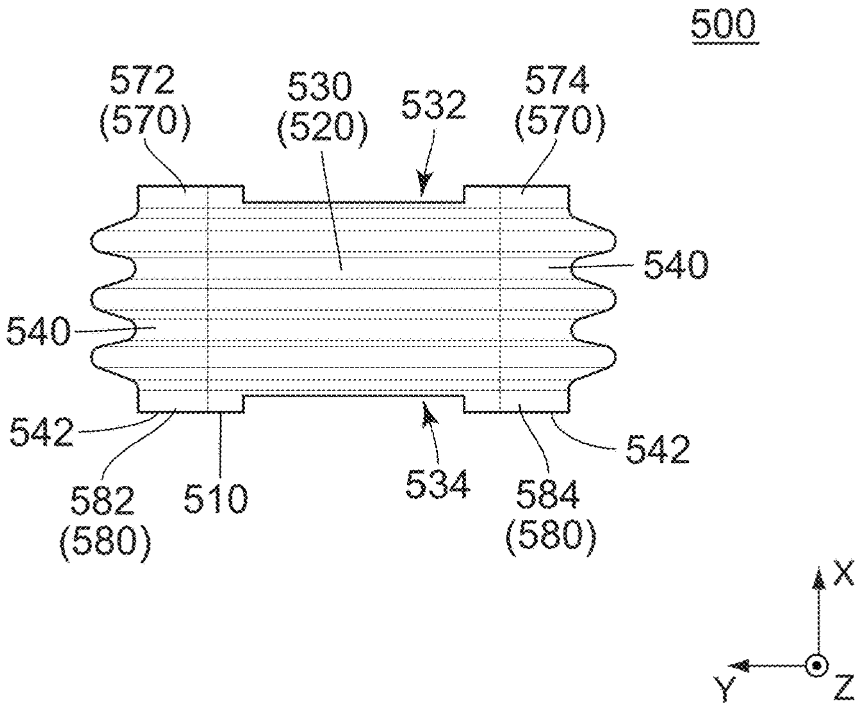
FIG. 14 is a top view showing the seal member of FIG. 13.
Figure 15:
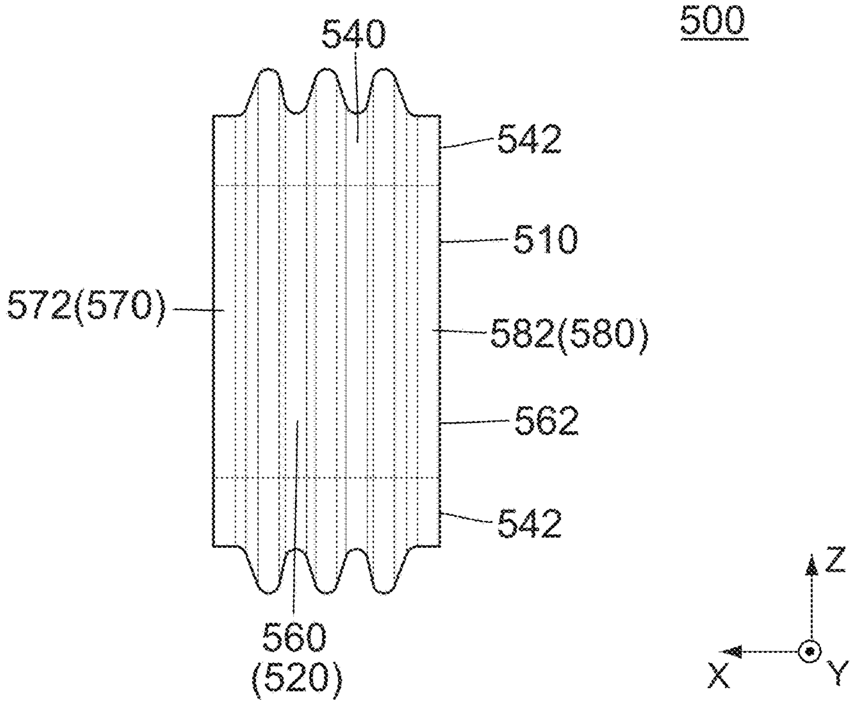
FIG. 15 is a side view showing the seal member of FIG. 13.

Referring to FIG. 14, the seal member 500 of the present embodiment is formed of elastic material. More specifically, the seal member 500 is formed of rubber. Referring to FIGS. 14 and 15, the seal member 500 has a symmetrical shape with respect to a plane which is perpendicular to the front-rear direction while passing through a middle of the seal member 500 in the front-rear direction. Referring to FIG. 13, the seal member 500 has a symmetrical shape with respect to a plane which is perpendicular to the up-down direction while passing through a middle of the seal member 500 in the up-down direction. The seal member 500 has a symmetrical shape with respect to a plane which is perpendicular to the right-left direction while passing through a middle of the seal member 500 in the right-left direction. When the seal member 500 is viewed along the front-rear direction, the seal member 500 has a closed-ring shape including second sides 520 and second coupling portions 540. In detail, when the seal member 500 is viewed along the front-rear direction, the seal member 500 has the closed-ring shape including four of the second sides 520 and four of the second coupling portions 540. Specifically, when the seal member 500 is viewed along the front-rear direction, the seal member 500 has the closed-ring shape which consists of the four second sides 520 and the four second coupling portions 540. In other words, the seal member 500 has an outer circumference which has a square shape with rounded corners in the plane perpendicular to the front-rear direction.

Figure 6:
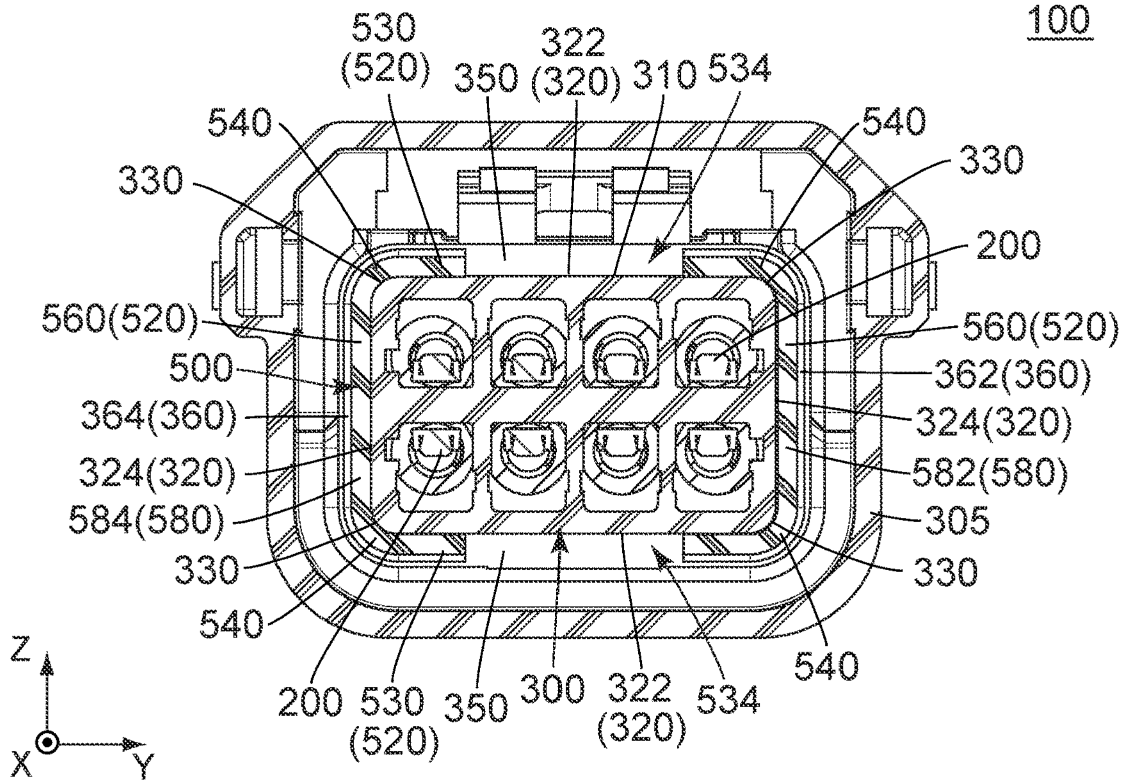
FIG. 6 is a cross-sectional view showing the waterproof connector of FIG. 5, taken along line C-C.

As shown in FIG. 6, the seal member 500 is attached to the attachment portion 310. The seal member 500 is surrounded by the surrounding portion 305 in the plane perpendicular to the front-rear direction. As shown in FIG. 3, in the front-rear direction, a front end of the seal member 500 is positioned rearward of the front end of the surrounding portion 305.

Referring to FIG. 6, the second sides 520 correspond to the first sides 320, respectively. Referring to FIGS. 11 and 13, $L_1>L_2$, where $L_2$ is a length of each of the second sides 520 in a state before the seal member 500 is attached to the attachment portion 310, and $L_1$ is a length of the first side 320 corresponding to the second side 520. Thus, the waterproof connector 100 of the present embodiment can prevent twisting of the seal member 500 when the waterproof connector 100 is mated with or removed from the mating connector. The lengths $L_2$ of the second sides 520 are equal to each other in the state before the seal member 500 is attached to the attachment portion 310. The length $L_2$ of each of the second sides 520 in the state before the seal member 500 is attached to the attachment portion 310 is smaller than a length $L_{1B}$ of any of the short sides 324 in the up-down direction. In other words, the waterproof connector 100 fulfills the following inequality: $L_2<L_{1B}<L_{1A}$.

As shown in FIG. 6, the second sides 520 include two specific second sides 530 and two second sides 560 other than the specific second sides 530. Hereinafter, the two second sides 560 other than the specific second sides 530 are also referred to as unspecific second sides 560. Each of the second sides 560 other than the specific second side 530 has a first flat surface 562. The first flat surface 562 extends in the plane perpendicular to the front-rear direction and faces rearward in the front-rear direction.

Referring to FIGS. 6 and 13, each of the specific second sides 530 of the present embodiment extends in a first predetermined direction perpendicular to the front-rear direction. In the present embodiment, the first predetermined direction is the horizontal direction. The specific second sides 530 correspond to the two long sides 322, respectively, of the first sides 320. Referring to FIGS. 6, 11 and 13, an expected amount G of distortion of each of the second sides 520 upon the attachment of the seal member 500 to the attachment portion 310 is defined by an equation of $G=(L_1-L_2)/L_2$, and the expected amount G of the distortion of each of the specific second sides 530 is maximum among the expected amounts G of the distortions of the second sides 520.

As understood from FIGS. 6 and 11, a part of each of the specific second sides 530 is accommodated in the first accommodating portion 370.

Referring to FIG. 14, each of the specific second sides 530 is provided with a front recess 532 and a rear recess 534.

As shown in FIG. 14, the front recess 532 of the present embodiment is recessed rearward in the front-rear direction. The front recess 532 is positioned at the middle of the seal member 500 in the horizontal direction. The front recess 532 is positioned forward in the front-rear direction beyond the rear recess 534.

As shown in FIG. 14, the rear recess 534 of the present embodiment is recessed forward in the front-rear direction. The rear recess 534 is positioned at the middle of the seal member 500 in the horizontal direction. The rear recess 534 is positioned rearward in the front-rear direction beyond the front recess 532. As shown in FIG. 3, the rear rotation prevention portion 350 is positioned within the rear recess 534.

As shown in FIG. 6, each of the unspecific second sides 560 of the present embodiment extends in a second predetermined direction perpendicular to the front-rear direction. In other words, each of the second sides 560 other than the specific second sides 530 extends in the second predetermined direction perpendicular to the front-rear direction. In the present embodiment, the second predetermined direction is the up-down direction. The unspecific second sides 560 correspond to the two short sides 324, respectively, of the first sides 320.

As understood from FIGS. 6 and 11, a part of each of the unspecific second sides 560 is accommodated in the first accommodating portion 370.

As described above, the first accommodating portion 370 accommodates both of the part of each of the specific second sides 530 and the part of each of the unspecific second sides 560. In other words, the first accommodating portion 370 accommodates a part of the seal member 500. This prevents twisting of the seal member 500. Additionally, this also prevents the seal member 500 from being moved outward in the direction perpendicular to the front-rear direction when the waterproof connector 100 is mated with the mating connector.

As shown in FIG. 13, the second coupling portions 540 extend in directions which are different from one another. Each of the second coupling portions 540 couples the second sides 520, which are adjacent to each other, with each other. Each of the second coupling portions 540 couples the specific second side 530 and the unspecific second side 560, which are adjacent to each other, with each other. As understood from FIGS. 6 and 11, a part of each of the second coupling portions 540 is accommodated in the first accommodating portion 370. As shown in FIG. 6, the second coupling portions 540 correspond to the first coupling portions 330, respectively. Each of the second coupling portions 540 is positioned at a position same as a position of the corresponding first coupling portion 330 when the seal member 500 is attached to the attachment portion 310. Each of the second coupling portions 540 has a second flat surface 542. The second flat surface 542 extends in the plane perpendicular to the front-rear direction and faces rearward in the front-rear direction. The first flat surface 562 couples the second flat surfaces 542 of the second coupling portions 540, which are adjacent to each other, with each other.

As described above, the waterproof connector 100 of the present embodiment is configured as follows: the second sides 520 include the two specific second sides 530; the expected amount G of the distortion of each of the second sides 520 upon the attachment of the seal member 500 to the attachment portion 310 is defined by the equation of $G=(L_1-L_2)/L_2$; and the expected amount G of the distortion of each of the specific second sides 530 is maximum among the expected amounts G of the distortions of the second sides 520. In other words, when the seal member 500 is attached to the attachment portion 310, the distortion produced in the specific second side 530 is greater than the distortion produced in the unspecific second side 560. Thus, if the waterproof connector 100 comprises a seal member 500 whose specific second side 530 is provided with none of the front recess 532 and the rear recess 534, tensional force generated by the specific second side 530 is greater than tensional force, which is generated by the unspecific second side 560, at a time just after the seal member 500 is attached to the attachment portion 310. In this case, a position of the second coupling portion 540 on the attachment portion 310 is deviated from the corresponding first coupling portion 330 so that an imbalance between these tensional forces is relieved. This deviation of the position of the second coupling portion 540 degrades sealing characteristics of the waterproof connector 100.

In contrast, the seal member 500 of the present embodiment is configured so that each of the specific second sides 530 is provided with the front recess 532 and the rear recess 534. Thus, the waterproof connector 100 of the present embodiment is configured as follows: each of the specific second sides 530, whose expected amount G of the distortion is maximum among the expected amounts G of the distortions of the second sides 520, is easily stretched as compared to any of the unspecific second sides 560 whose expected amount G of the distortion is smaller than the expected amount G of the distortion of the specific second side 530; and an imbalance between tensional force, which is generated by the specific second side 530, and tensional force, which is generated by the unspecific second side 560, is relieved at a time just after the seal member 500 is attached to the attachment portion 310. This prevents a position of the second coupling portion 540 on the attachment portion 310 from being deviated from the corresponding first coupling portion 330, namely, an appropriate position, when the seal member 500 is attached to the attachment portion 310. In other words, the waterproof connector 100 of the present embodiment prevents degradation of sealing characteristics.

Referring to FIGS. 13, 14 and 15, the waterproof connector 100 is configured as follows: each of the specific second sides 530 has a part which is provided with the front recess 532; the part of each of the specific second sides 530 has a cross-section perpendicular to the first predetermined direction; each of the unspecific second side 560 has a cross-section perpendicular to the second predetermined direction; and the cross-section of the part of each of the specific second sides 530 is smaller than the cross-section of any of the unspecific second sides 560. In other words, the cross-section of the part of each of the specific second sides 530 is smaller than the cross-section of any of the second sides 560 other than the specific second sides 530. Thus, each of the specific second sides 530 is easily stretched as compared to any of the unspecific second sides 560, and thereby the position of the second coupling portion 540 on the attachment portion 310 is prevented from being deviated from the appropriate position. In other words, the waterproof connector 100 of the present embodiment prevents degradation of the sealing characteristics.

Referring to FIGS. 13, 14 and 15, the waterproof connector 100 is configured as follows: each of the specific second sides 530 has a portion which is provided with the rear recess 534; the portion of each of the specific second sides 530 has a cross-section perpendicular to the first predetermined direction; and the cross-section of the portion of each of the specific second sides 530 is smaller than the cross-section of any of the unspecific second sides 560. In other words, the cross-section of the portion of each of the specific second sides 530 is smaller than the cross-section of any of the second sides 560 other than the specific second sides 530. Thus, each of the specific second sides 530 is easily stretched as compared to any of the unspecific second sides 560, and thereby the position of the second coupling portion 540 on the attachment portion 310 is prevented from being deviated from the appropriate position. In other words, the waterproof connector 100 of the present embodiment prevents degradation of the sealing characteristics.

As shown in FIGS. 14 and 15, the seal member 500 has a front accommodated portion 570 and a rear accommodated portion 580.

As shown in FIG. 14, the front accommodated portion 570 of the present embodiment is positioned at the front end of the seal member 500 in the front-rear direction. The front accommodated portion 570 includes a front right accommodated portion 572 and a front left accommodated portion 574.

As shown in FIG. 14, the front right accommodated portion 572 of the present embodiment is positioned rightward of the front left accommodated portion 574 in the right-left direction. The front right accommodated portion 572 and the front left accommodated portion 574 are arranged in the right-left direction.

As shown in FIG. 14, the front left accommodated portion 574 of the present embodiment is positioned leftward of the front right accommodated portion 572 in the right-left direction. The front recess 532 is positioned between the front right accommodated portion 572 and the front left accommodated portion 574 in the right-left direction. The front right accommodated portion 572, the front left accommodated portion 574 and the front recess 532 are positioned at positions same as each other in the front-rear direction.

As shown in FIG. 14, the rear accommodated portion 580 of the present embodiment is positioned at the rear end 510 of the seal member 500 in the front-rear direction. As understood from FIGS. 6 and 11, the rear accommodated portion 580 is accommodated in the first accommodating portion 370. The rear accommodated portion 580 includes a rear right accommodated portion 582 and a rear left accommodated portion 584.

As shown in FIG. 14, the rear right accommodated portion 582 of the present embodiment is positioned rightward of the rear left accommodated portion 584 in the right-left direction. The rear right accommodated portion 582 and the rear left accommodated portion 584 are arranged in the right-left direction. As shown in FIG. 3, the rear right accommodated portion 582 is accommodated in the first right accommodating portion 372.

As shown in FIG. 14, the rear left accommodated portion 584 of the present embodiment is positioned leftward of the rear right accommodated portion 582 in the right-left direction. The rear recess 534 is positioned between the rear right accommodated portion 582 and the rear left accommodated portion 584 in the right-left direction. The rear right accommodated portion 582, the rear left accommodated portion 584 and the rear recess 534 are positioned at positions same as each other in the front-rear direction. As shown in FIG. 3, the rear left accommodated portion 584 is accommodated in the first left accommodating portion 374.

Referring to FIG. 7, each of the terminals 200 of the present embodiment is made of metal. Each of the terminals 200 is a so-called female contact. As shown in FIG. 6, the terminals 200 are held by the housing 300.

Referring to FIG. 7, the waterproof connector 100 further comprises a front retainer 400.

Figure 4:
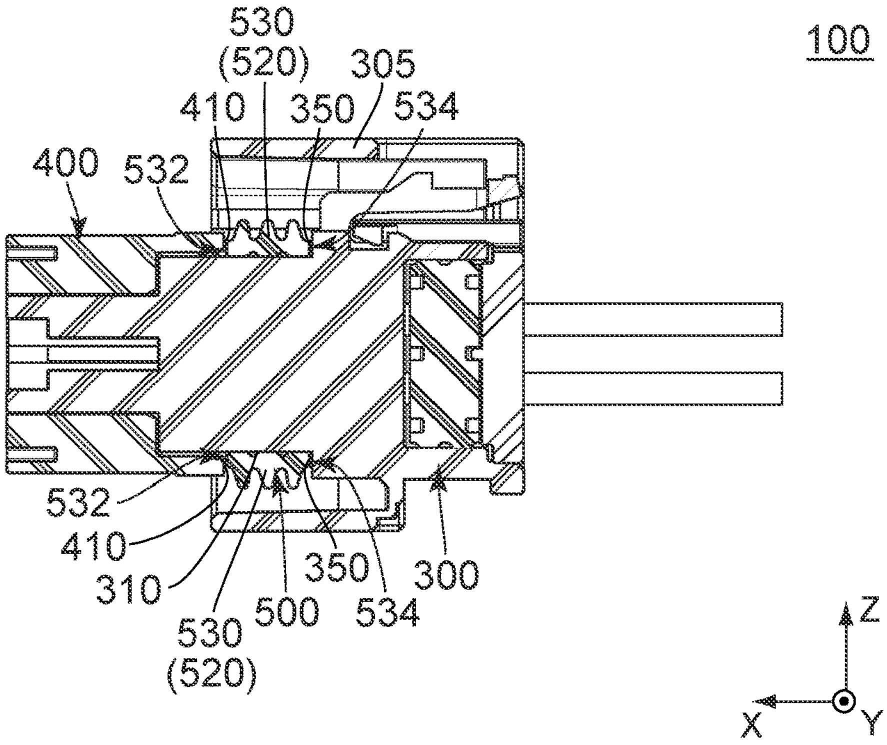
FIG. 4 is a cross-sectional view showing the waterproof connector of FIG. 2, taken along line B-B.
Figure 5:
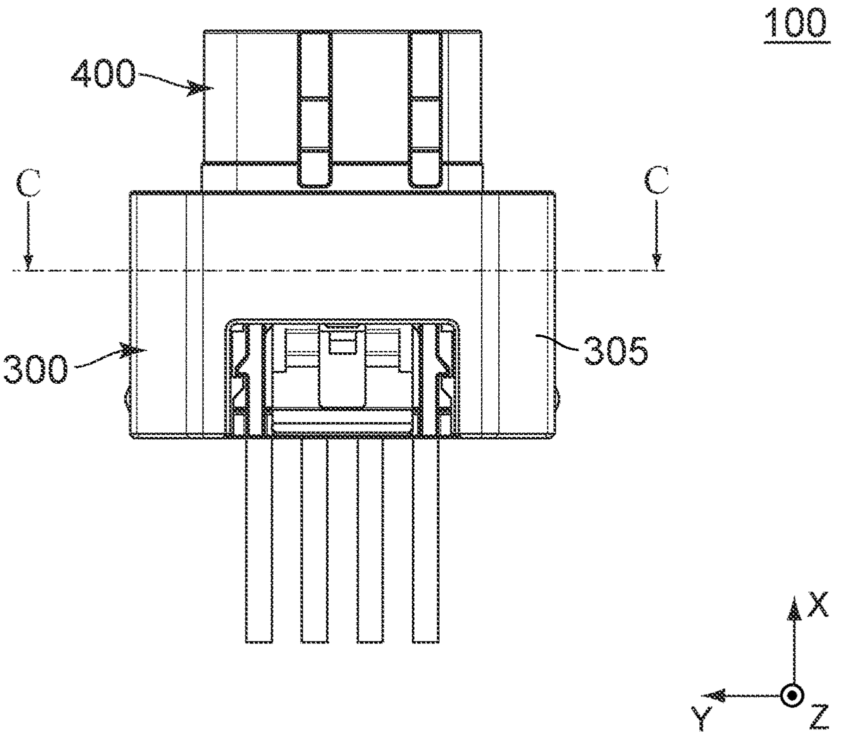
FIG. 5 is a top view showing the waterproof connector of FIG. 1.
Figure 16:
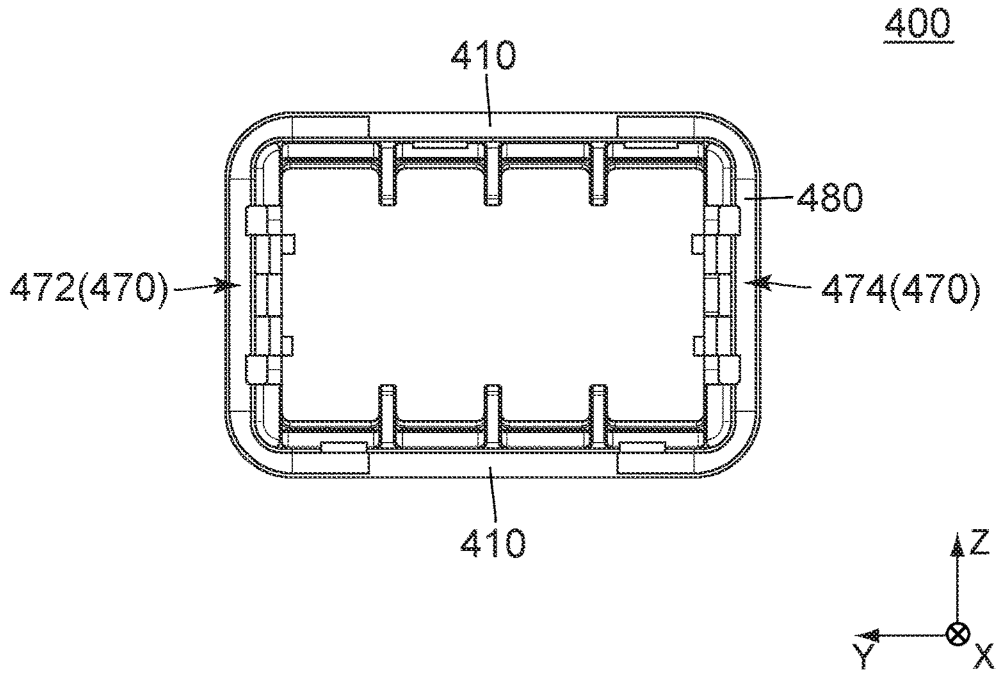
FIG. 16 is a rear view showing a front retainer which is included in the waterproof connector of FIG. 7.
Figure 17:
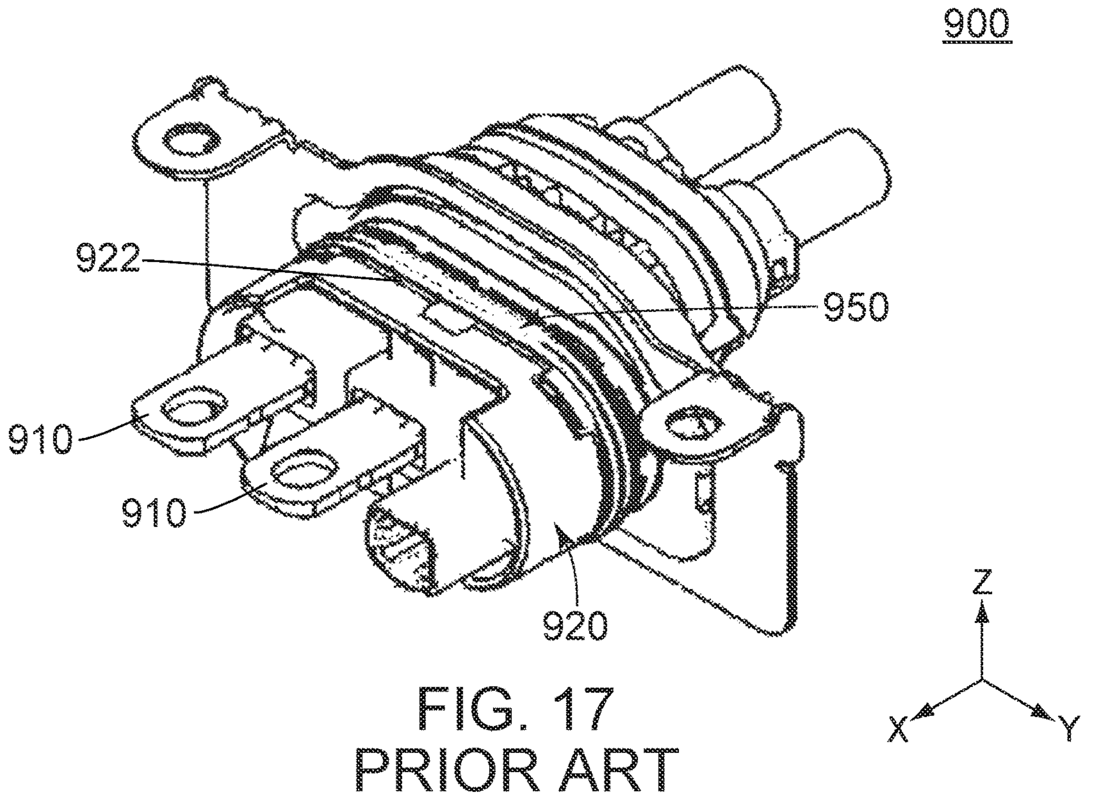
FIG. 17 PRIOR ART
FIG. 17 is a perspective view showing a waterproof connector of Patent Document 1.

As shown in FIG. 4, the front retainer 400 of the present embodiment is attached to the attachment portion 310. As shown in FIG. 16, the front retainer 400 has a front end portion 480.

As shown in FIG. 3, the front end portion 480 of the present embodiment faces rearward in the front-rear direction. The seal member 500 is sandwiched between the front end portion 480 and the rear end portion 340 in the front-rear direction. In other words, the seal member 500 is sandwiched between the front retainer 400 and the housing 300 in the front-rear direction.

As shown in FIG. 16, the front retainer 400 further has a second accommodating portion 470.

Referring to FIG. 16, the second accommodating portion 470 is a recess which is recessed forward in the front-rear direction. The front end portion 480 defines a front end of the second accommodating portion 470 in the front-rear direction. Referring to FIGS. 3, 13 and 16, the second accommodating portion 470 accommodates a part of each of the specific second sides 530 and a part of each of the unspecific second sides 560. In other words, the second accommodating portion 470 accommodates a part of the seal member 500. This further prevents twisting of the seal member 500. Additionally, this also further prevents the seal member 500 from being moved outward in the direction perpendicular to the front-rear direction when the waterproof connector 100 is mated with the mating connector. The second accommodating portion 470 includes a second right accommodating portion 472 and a second left accommodating portion 474.

As shown in FIG. 16, the second right accommodating portion 472 of the present embodiment is positioned rightward of the second left accommodating portion 474 in the right-left direction. The second right accommodating portion 472 and the second left accommodating portion 474 are arranged in the right-left direction. As shown in FIG. 3, the front right accommodated portion 572 is accommodated in the second right accommodating portion 472.

As shown in FIG. 16, the second left accommodating portion 474 of the present embodiment is positioned leftward of the second right accommodating portion 472 in the right-left direction. As shown in FIG. 3, the front left accommodated portion 574 is accommodated in the second left accommodating portion 474.

As shown in FIG. 16, the front retainer 400 of the present embodiment is provided with two front rotation prevention portions 410. However, the present invention is not limited thereto, but the number of the front rotation prevention portion 410 may be one.

Referring to FIG. 3, each of the front rotation prevention portions 410 of the present embodiment protrudes in the front-rear direction from the front end portion 480. More specifically, each of the front rotation prevention portions 410 protrudes rearward in the front-rear direction from the front end portion 480. The front rotation prevention portion 410 is positioned within the front recess 532. As shown in FIG. 4, in the front-rear direction, a rear end of each of the front rotation prevention portions 410 is positioned rearward beyond the front end of the surrounding portion 305 of the housing 300.

As shown in FIG. 16, each of the front rotation prevention portions 410 is positioned between the second right accommodating portion 472 and the second left accommodating portion 474 in the right-left direction. The second right accommodating portion 472 is positioned rightward of any of the front rotation prevention portions 410 in the right-left direction. The second left accommodating portion 474 is positioned leftward of any of the front rotation prevention portions 410 in the right-left direction.

Although the specific explanation about the present invention is made above referring to the embodiments, the present invention is not limited thereto and is susceptible to various modifications and alternative forms.

Although the waterproof connector 100 of the aforementioned embodiment is configured so that the second sides 520 include the two specific second sides 530, the present invention is not limited thereto. Specifically, the second sides 520 should include at least one specific second side 530. In this case, the waterproof connector 100 should be configured as follows: the expected amount G of the distortion of each of the second sides 520 upon the attachment of the seal member 500 to the attachment portion 310 is defined by the equation of $G=(L_1-L_2)/L_2$; the expected amount G of the distortion of the at least one specific second side 530 is maximum among the expected amounts G of the distortions of the second sides 520; and the at least one specific second side 530 is provided with the front recess 532 and the rear recess 534. This enables the waterproof connector 100 to obtain the same effect as in the present embodiment.

Although the housing 300 of the aforementioned embodiment has the rear end portion 340, the first accommodating portion 370 and the rear rotation prevention portions 350, the present invention is not limited thereto. Specifically, the housing 300 may have no first accommodating portion 370. Additionally, the housing 300 may have no rear rotation prevention portion 350. Similarly, although the front retainer 400 of the aforementioned embodiment has the front end portion 480, the second accommodating portion 470 and the front rotation prevention portions 410, the present invention is not limited thereto. Specifically, the front retainer 400 may have no second accommodating portion 470. Additionally, the front retainer 400 may have no front rotation prevention portion 410. In order to obtain the same effect, which is that the seal member 500 is sandwiched between the front retainer 400 and the housing 300 in the front-rear direction, as in the present embodiment, the waterproof connector 100 is required to be configured so that the housing 300 has the rear end portion 340 while the front retainer 400 has the front end portion 480. In the waterproof connector 100 with such a configuration, the rear rotation prevention portion 350 is required to protrude forward in the front-rear direction from the rear end portion 340 if the housing 300 is provided with the rear rotation prevention portion 350. Similarly, in the waterproof connector 100 with such a configuration, the front rotation prevention portion 410 is required to protrude rearward in the front-rear direction from the front end portion 480 if the front retainer 400 is provided with the front rotation prevention portion 410.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A waterproof connector mateable with a mating connector along a front-rear direction, wherein:

the waterproof connector comprises a terminal, a housing and a seal member;

the terminal is held by the housing;

the housing is provided with an attachment portion;

when the attachment portion is viewed along the front-rear direction, the attachment portion has an outer circumferential shape including first sides and first coupling portions;

the first coupling portions extend in directions which are different from one another;

each of the first coupling portions couples the first sides, which are adjacent to each other, with each other;

the seal member is formed of elastic material and is attached to the attachment portion;

when the seal member is viewed along the front-rear direction, the seal member has a closed-ring shape including second sides and second coupling portions;

the second sides correspond to the first sides, respectively;

the second coupling portions extend in directions which are different from one another;

each of the second coupling portions couples the second sides, which are adjacent to each other, with each other;

the second sides include at least one specific second side;

the at least one specific second side is provided with a front recess and a rear recess;

the front recess is recessed rearward in the front-rear direction;

the rear recess is recessed forward in the front-rear direction;

$L_1 > L_2$, where $L_2$ is a length of each of the second sides in a state before the seal member is attached to the attachment portion, and $L_1$ is a length of the corresponding first side;

an expected amount G of distortion of each of the second sides upon attachment of the seal member to the attachment portion is defined by an equation of $G=(L_1-L_2)/L_2$;

the expected amount G of the distortion of the at least one specific second side is maximum among the expected amounts G of the distortions of the second sides;

each of the second sides other than the specific second side has a first flat surface;

the first flat surface extends in a plane perpendicular to the front-rear direction and faces rearward in the front-rear direction;

each of the second coupling portions has a second flat surface;

the second flat surface extends in the plane perpendicular to the front-rear direction and faces rearward in the front-rear direction;

the first flat surface couples the second flat surfaces of the second coupling portions, which are adjacent to each other, with each other;

the at least one specific second side includes two of the specific second sides;

the first sides include two long sides and two short sides;

each of the two long sides extends in a horizontal direction perpendicular to the front-rear direction;

each of the two short sides extends in an up-down direction perpendicular to both the front-rear direction and the horizontal direction;

the specific second sides correspond to the two long sides, respectively, of the first sides;

a size of the long side in the horizontal direction is greater than a size of the short side in the up-down direction; and the lengths of the second sides are equal to each other in the state before the seal member is attached to the attachment portion.

2. The waterproof connector as recited in claim 1, wherein:

the specific second side extends in a first predetermined direction perpendicular to the front-rear direction;

each of the second sides other than the specific second side extends in a second predetermined direction perpendicular to the front-rear direction;

the specific second side has a part which is provided with the front recess;

the part of the specific second side has a cross-section perpendicular to the first predetermined direction;

each of the second sides other than the specific second side has a cross-section perpendicular to the second predetermined direction; and the cross-section of the part of the specific second side is smaller than the cross-section of any of the second sides other than the specific second side.

3. The waterproof connector as recited in claim 1, wherein:

the housing has a rear end portion;

the rear end portion is positioned outside the attachment portion in the plane perpendicular to the front-rear direction;

the attachment portion extends forward in the front-rear direction from the rear end portion;

the seal member has a rear end in the front-rear direction; and the rear end of the seal member is pressed against the rear end portion.

4. The waterproof connector as recited in claim 3, wherein:

the housing is provided with a rear rotation prevention portion;

the rear rotation prevention portion protrudes forward in the front-rear direction from the rear end portion; and the rear rotation prevention portion is positioned within the rear recess.

5. The waterproof connector as recited in claim 3, wherein:

the waterproof connector further comprises a front retainer;

the front retainer is attached to the attachment portion;

the front retainer has a front end portion; and the seal member is sandwiched between the front end portion and the rear end portion in the front-rear direction.

6. The waterproof connector as recited in claim 5, wherein:

the front retainer is provided with a front rotation prevention portion;

the front rotation prevention portion protrudes rearward in the front-rear direction from the front end portion; and the front rotation prevention portion is positioned within the front recess.

* * * * *